(12) United States Patent
Melville

(10) Patent No.: US 6,257,727 B1
(45) Date of Patent: Jul. 10, 2001

(54) AUGMENTED IMAGING USING SILHOUETTE TO IMPROVE CONTRAST

(75) Inventor: Charles D. Melville, Issaquah, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/569,379

(22) Filed: May 11, 2000

Related U.S. Application Data

(63) Continuation of application No. 09/189,738, filed on Nov. 10, 1998, now abandoned, which is a continuation of application No. 09/009,759, filed on Jan. 20, 1998, now Pat. No. 5,913,591.

(51) Int. Cl.[7] .............................. G03B 21/14; G02B 27/10
(52) U.S. Cl. .................................. 353/28; 359/630; 345/9
(58) Field of Search .................................. 353/28, 30, 97, 353/62; 359/629, 630; 349/11; 345/7, 8, 9

(56) References Cited

U.S. PATENT DOCUMENTS

| 5,526,184 | 6/1996 | Tokuhashi et al. ............... 359/630 |
| 5,625,493 | 4/1997 | Matsumara et al. ............... 359/630 |
| 5,712,649 | 1/1998 | Tosaki ................................ 359/630 |
| 5,726,806 | 3/1998 | Holden et al. .................... 359/630 |
| 5,742,262 | 4/1998 | Tabata et al. ......................... 345/8 |
| 5,913,591 | 6/1999 | Melville ............................. 359/214 |
| 6,037,914 * | 3/2000 | Robinson ............................... 345/7 |

* cited by examiner

Primary Examiner—William Dowling
(74) Attorney, Agent, or Firm—Steven P. Koda

(57) ABSTRACT

An augmented display includes an image display source and a silhouette display source. The image display source generates a virtual image to be perceived by a viewer. The silhouette display source occurs in the path of the background light. The silhouette display source generates a mask corresponding to the image content of the image display. The mask is a darkened area reducing or blocking background light. As the light from the virtual image is overlaid onto the background, there is less background light in the portion where the image appears.

10 Claims, 4 Drawing Sheets

AUGMENTED IMAGING USING SILHOUETTE TO IMPROVE CONTRAST

CROSS REFERENCE TO RELATED APPLICATIONS

This is a continuation of U.S. patent application Ser. No. 09/189,738 filed Nov. 10, 1998 now abandoned for Augmented Imaging Using a Silhouette to Improve Contrast, which is a continuation of U.S. patent application Ser. No. 09/009,759 filed Jan. 20, 1998 now U.S. Pat. No. 5,913,591, for Augmented Imaging Using a Silhouette to Improve Contrast. The content of such applications are incorporated herein by reference and made a part hereof.

BACKGROUND OF THE INVENTION

This invention relates to augmented imaging techniques and augmented displays.

An augmented display is a see-through display which overlays an image onto a background. The overlaid image is a virtual image. The background is a real world view of the ambient environment. The overall image is formed by adding light to the background. The added light corresponds to the virtual image. The virtual image appears to be transparent because in the display portion where the image is formed, light from both the virtual image and the background impinge on the same photoreceptors in the viewer's eye. Because light from both light sources impinge on the same photoreceptors, it may be difficult for the viewer to distinguish between the image and the background. This invention is directed toward a method and apparatus for improving the contrast of an augmented display.

SUMMARY OF THE INVENTION

According to the invention, an augmented display includes an image display source and a silhouette display source. The image display source generates a luminous virtual image to be perceived by a viewer. The silhouette display source occurs in the path of the background light.

According to one aspect of this invention, the silhouette display source generates a mask corresponding to the image content of the image display. The mask is a darkened area reducing or blocking background light. As the light from the virtual image is overlaid onto the background, there is less background light in the portion where the image appears. In one embodiment the mask shape and size is the same as the virtual image content created by the image display. In effect, the mask is a dark version of the virtual image content. In another embodiment the mask encompasses more area than just the image area of the virtual image An advantage of using a silhouette mask is that the content of the virtual image appears to be solid, rather than transparent. The virtual image overlays and eclipses the background objects.

According to another aspect of the invention, in a telescope embodiment the silhouette display source is located at the intermediate image plane of the telescope. An advantage of locating the silhouette display source at the intermediate image plane is that the darkened silhouette is in focus. There is a sharp edge between the background and the silhouette mask. Another advantage is that the virtual image appears more real when the mask is in focus.

These and other aspects and advantages of the invention will be better understood by reference to the following detailed description taken in conjunction with the accompanying drawings.

DESCRIPTION OF SPECIFIC EMBODIMENTS

Overview

Figure 1:
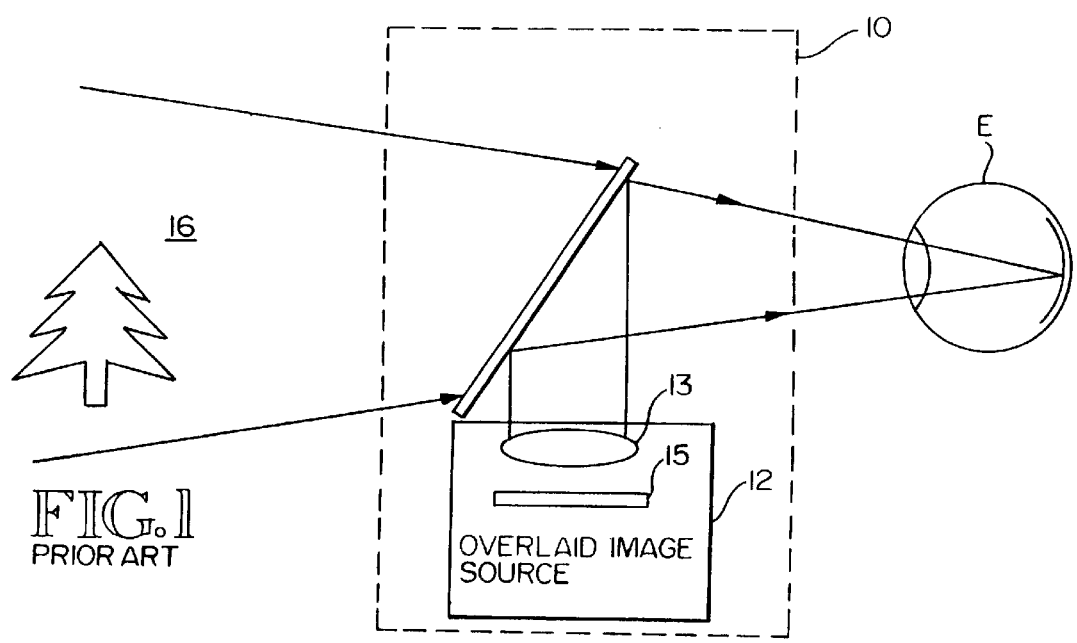
FIG. 1 is a block diagram of a conventional augmented display.

FIG. 1 shows a block diagram of a conventional augmented display apparatus 10. The display apparatus 10 includes a generated image source 12 and a beamsplitter 14. The image source 12 includes a lens 13 and an image plane generator 15. Light is received at the beamsplitter 14 from the image source 12 and from the outside ambient environment 16. The light from each passes through the beamsplitter and reaches a viewer's eye E. In effect the image generated by the image source 12 is overlaid onto the background view of the ambient environment.

Figure 2:
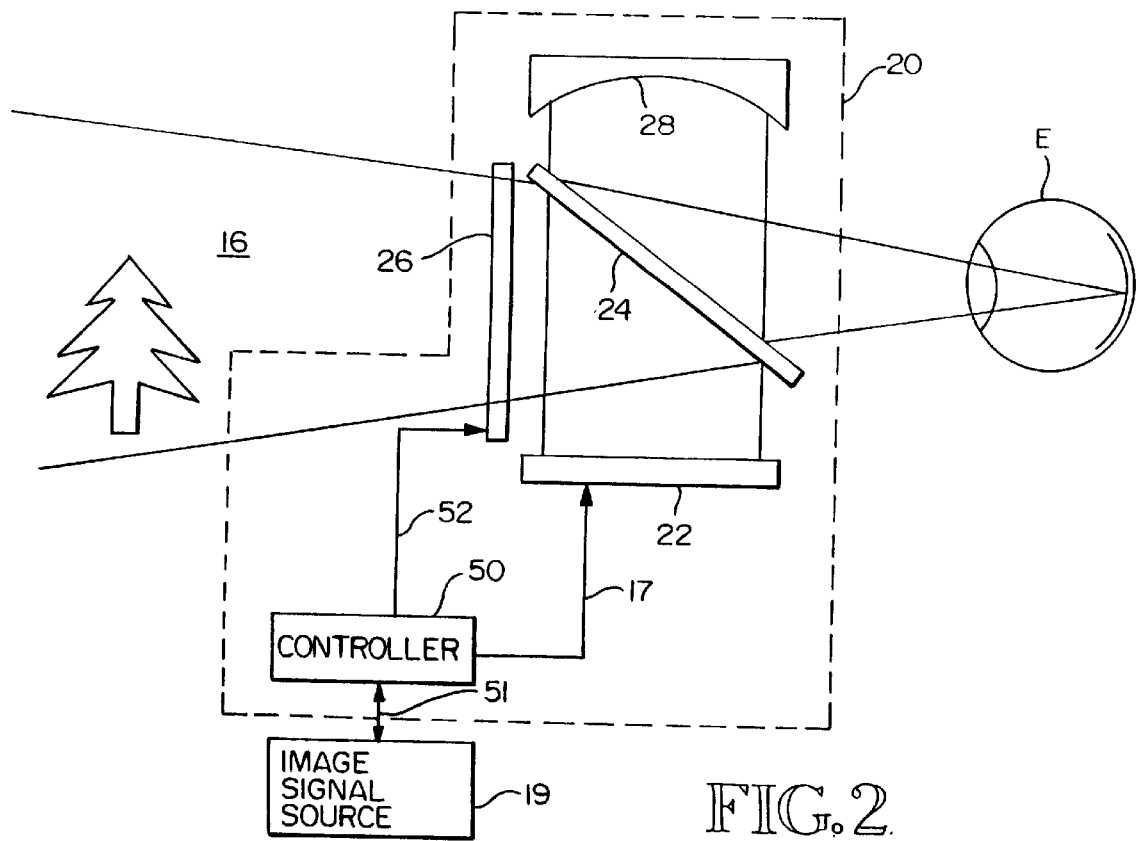
FIG. 2 is an optical schematic of an augmented display according to one embodiment of this invention.

FIG. 2 shows an optical schematic diagram of an augmented display 20 according to an embodiment of this invention. The display 20 includes a virtual image display 22, a silhouette display 26, a controller 50, a beamsplitter 24 and a mirror 28. The display 20 receives an image signal 51, such as an RGB signal, NTSC signal, VGA signal or other formatted color or monochrome video or image data signal, from an image signal source 19. A virtual image signal 17 and a silhouette image signal 52 are derived from the image signal 51 at the controller 50. The virtual image signal 17 is input to the virtual image display 22 which in response generates light for forming a virtual image. The silhouette image signal 52 is input to a silhouette display 26 which in response generates a silhouette image. The virtual image display 22 is a flat panel display, CRT monitor, or virtual retinal display. Light defining a virtual image is emitted from the virtual image display 22 and passes through the beamsplitter 24 before impinging on the viewer's eye E. The silhouette display 26 is a liquid crystal display panel or another transparent display device which passes background light from the ambient environment. Background light 16 passes through the silhouette display 26 and beamsplitter 24, then impinges on the viewer's eye E. The concave mirror 28 receives some of the virtual image light from the beamsplitter. The mirror 28 reflects such light back into the beamsplitter and on to the viewer's eye E to increase the amount of light reaching the eye E. The mirror acts like a lens to locate the virtual image at the same apparent distance as the real image.

Figure 3:
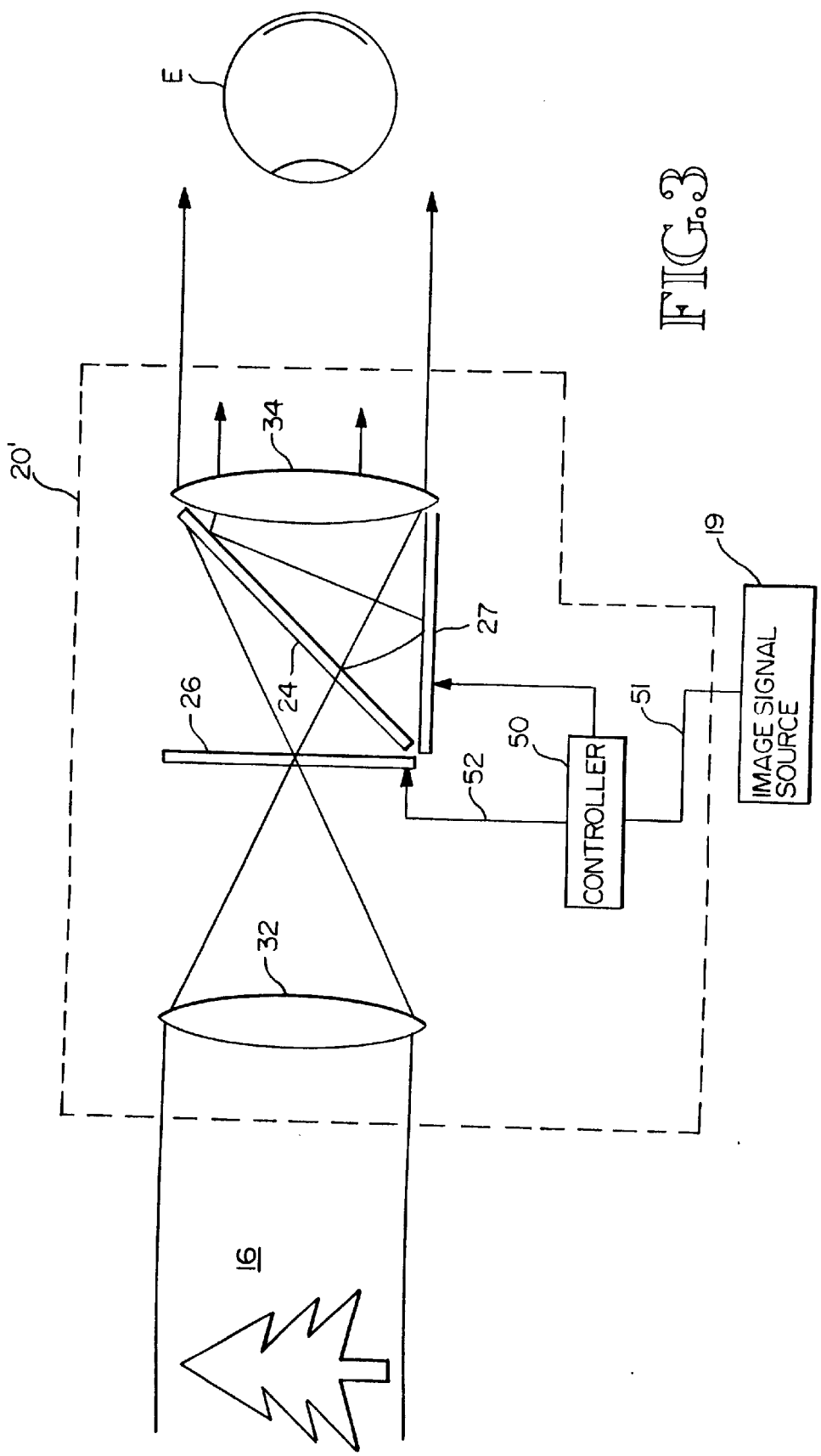
FIG. 3 is an optical schematic of an augmented display according to another embodiment of this invention.

FIG. 3 shows an alternative embodiment of an augmented display 20'. Components serving a similar function as in display 20 are given the same part numbers. The display 20' includes a virtual image source 22, such as a flat panel display, CRT monitor, or virtual retinal display. In addition, the display 20' includes a beamsplitter 24, a silhouette display 26, an objective lens 32, an eyepiece 34 and a controller 50. Background light passes through the objective lens 32 and is focused to an intermediate image plane which is concurrent with the silhouette display 26. The silhouette display 26 is normally transparent and passes the focused background light. The background light passes through the silhouette display 26, beamsplitter 24, and an eyepiece 34, then impinges on the viewer's eye E. Light defining a virtual image is emitted from the virtual image source 22 and passed through the beamsplitter 24 and eyepiece 34 before impinging on the viewer's eye E.

Operation

Figure 4:
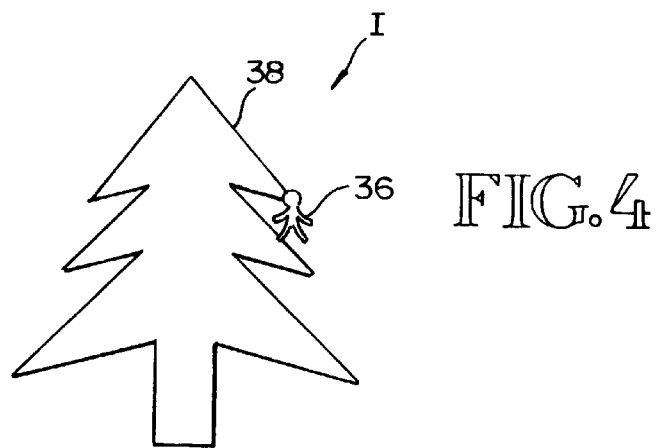
FIG. 4 is a diagram of an image generated by the display of FIG. 1.
Figure 5:
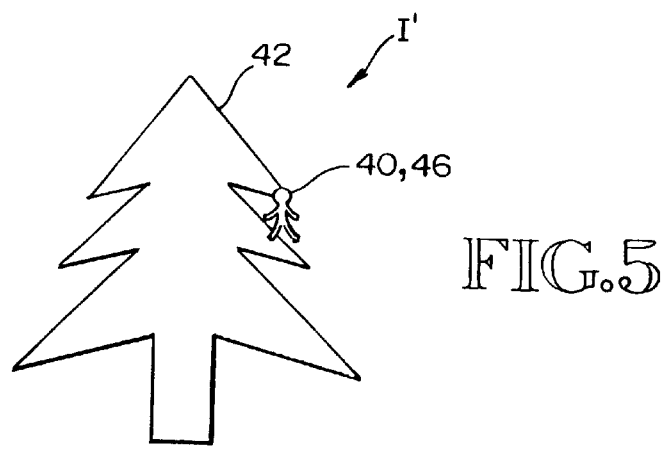
FIG. 5 is a diagram of an image generated by the display of FIGS. 2 or 3 according to an embodiment of this invention.

FIG. 4 shows an image I perceived by a viewer for the conventional display 10 of FIG. 1. An image 36 is overlaid onto a background image 38. Note that the overlaid image 36 is transparent. FIG. 5 shows an image I' perceived by a viewer for the displays 20 or 20' of FIGS. 2 and 3 according to this invention. Although the same image I' is depicted for each display 20, 20', in practice the image from display 20 will have a fuzzy, out of focus dark area around the overlaid image I'. The image I' from display 20' will have a sharper, in focus border at the overlaid image I'.

Figure 6:
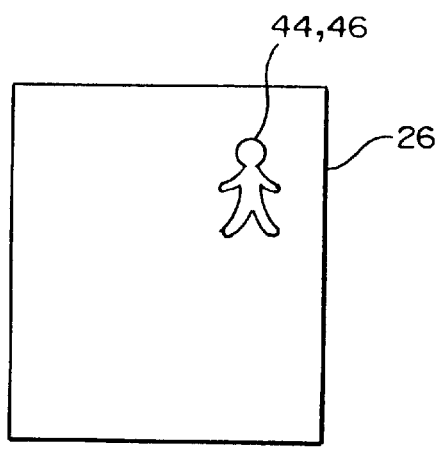
FIG. 6 is a diagram of the silhouette display 26 of FIGS. 2 or 3 with a masked region shown according to an embodiment of this invention.

A virtual image 40 is generated by the virtual image display 22. Concurrently a background image 42 formed by background light from the ambient environment is passed through the silhouette display 26. In effect the virtual image 40 is overlaid onto the background image 42. According to one aspect of this invention, the silhouette display 26 is darkened within a select region 44 (see FIG. 6) to reduce or preclude background light from passing through such select region 44. Such select region 44 corresponds to the virtual image 40 and serves as a mask 46. In one embodiment the mask 46 coincides with the virtual image 40 (see FIG. 5). In another embodiment the mask 46 encompasses more area than just the virtual image 40 (see FIGS. 7 and 8).

To define the virtual image 40, the virtual image display 22 receives image data signals 51 from a computer or other signal source 19. In one embodiment a controller 50 for the silhouette display 26 also receives such image data signals 51. In response the controller 50 generates a masking signal 52 which darkens a select region 44 of the silhouette display 26 to define the corresponding mask 46. In one embodiment a pixel to pixel mask 46 (see FIG. 6) is generated, in which for each pixel of the virtual image 40 there is a corresponding pixel darkened in the silhouette display 26. In another embodiment, in addition to pixel to pixel masking, additional pixels on the silhouette display 26 are darkened to mask other portions within or around the virtual image 40 (see FIG. 8).

Figure 7:
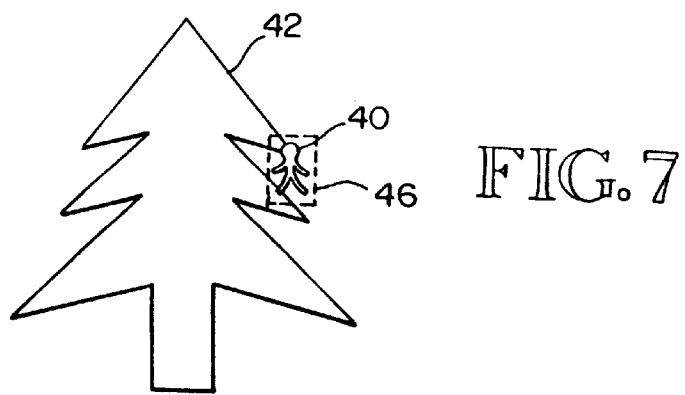
FIG. 7 is a diagram of an image generated by the display of FIGS. 2 or 3 according to an embodiment of this invention.
Figure 8:
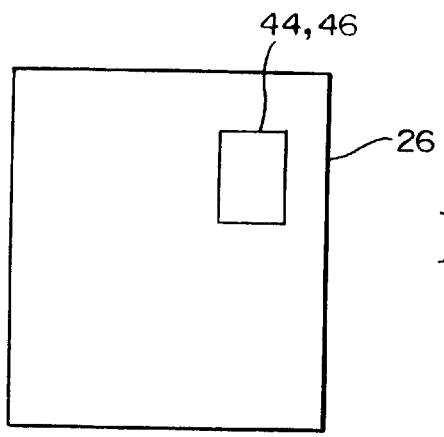
FIG. 8 is a diagram of the silhouette display 26 of FIGS. 2 or 3 with an alternative masked region shown according to an embodiment of this invention.

Although the images shown in FIGS. 5 and 7 include only one virtual image 40 and one mask 46, in alternative embodiments there are multiple images 40 and masks 46 viewable at a given time. Similarly, although only one mask is shown in each of FIGS. 6 and 8, in alternative embodiments multiple darkened regions 44 and masks 46 are formed.

In one embodiment the silhouette display 26 has the same pixel resolution as the virtual image source display 22. In another embodiment the silhouette display 26 has a differing resolution (e.g., lower or higher resolution) than the virtual image display 22. For varying resolution, the mapping of the virtual image 40 to the mask 46 differs than one pixel to one pixel. For every pixel of the virtual image display 22, there is at least one pixel of the silhouette display 26 which is darkened. However, the pixel darkened for the silhouette display 26 may encompass one or more pixels of the image display 22 (e.g., where silhouette display 26 has lower resolution than the virtual image display 22). According to one embodiment the silhouette display 26 is formed by a transparent liquid crystal display ('LCD') panel. The LCD panel is addressable to pixel precision. When a pixel is activated the region of the pixel on the panel darkens reducing or precluding background light from passing.

Although the controller 50 is shown to receive the image data signal 51, in an alternative embodiment the processor generating the image data signal 51 for the display 22 also serves as the controller for generating the masking signal 52.

Virtual Retinal Display

Figure 9:
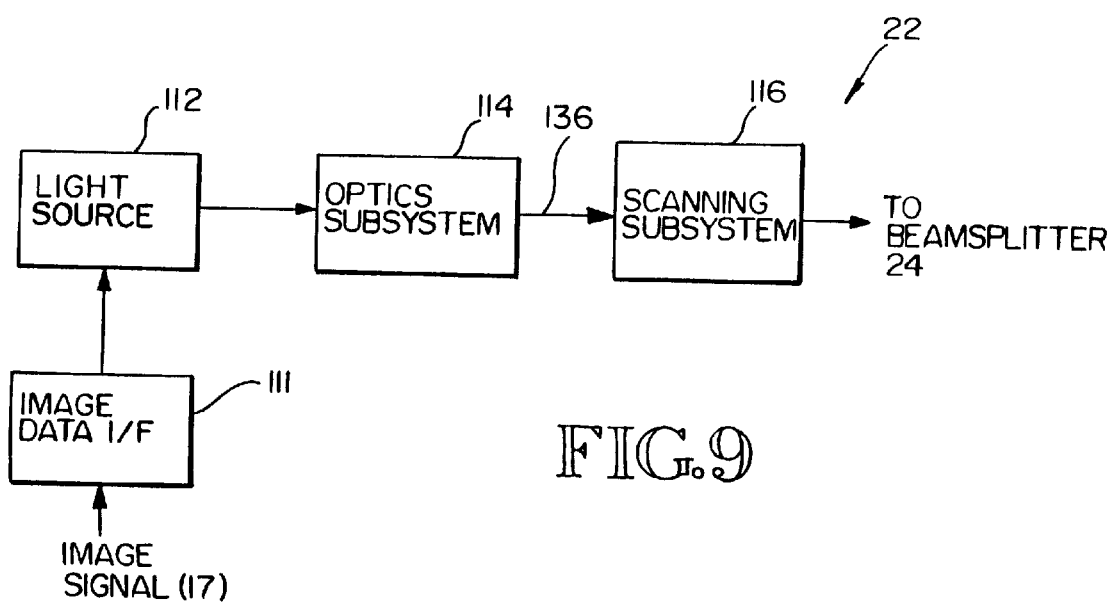
FIG. 9 is an optical schematic of a virtual retinal display embodiment of the virtual image source of FIGS. 2 and 3.

FIG. 9 is a block diagram of a virtual retinal display 22 which generates and manipulates light to create color or monochrome images having narrow to panoramic fields of view and low to high resolutions. The display 22 includes an image data interface 111 which receives a virtual image signal 17 from the controller 50 (see FIGS. 2 or 3). The image data interface 111 generates signals for controlling a light source 112. Light modulated with video information corresponds to image elements (e.g., image pixels) which are scanned onto the retina of a viewer's eye E to produce the perception of an erect virtual image.

The virtual image signal 17 is a video or other image signal, such as an RGB signal, NTSC signal, VGA signal or other formatted color or monochrome video or graphics signal. An exemplary embodiment of the image data interface 111 extracts color component signals and synchronization 'SYNCH' signals from the received image signal. In an embodiment in which an image signal has embedded red, green and blue components, the red signal is extracted and routed to a modulator for modulating a red light point source output. Similarly, the green signal is extracted and routed to a modulator for modulating the green light point source output. Also, the blue signal is extracted and routed to a modulator for modulating the blue light point source output.

The light source 112 includes one or more point sources of light. For generating a monochrome image a single monochrome emitter typically is used. For color imaging, multiple light emitters (e.g., red light point source, green light point source, and blue light point source) are used. Preferably the emitted light is spatially coherent. Exemplary light emitters include colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Where the light emitters are externally modulated, the display device 22 also includes a modulator responsive to an image data signal received from the image data interface 111. The modulator modulates the visible light emitted by the light emitters to define image content for the virtual imagery scanned on a viewer's eye. The modulator is an acoustooptic, electrooptic, or micro-electromechanical modulator. Additional detail on these and other light source 112 embodiments are found in U.S. patent application Ser. No. 08/437,818 for "Virtual Retinal Display with Fiber Optic Point Source" filed May 9, 1995, and incorporated herein by reference. According to alternative embodiments, the light emitters or the light generated by the point sources are modulated to include red, green, and/or blue components at a given point (e.g., pixel) of a resulting image. Respective beams of the point sources are modulated to introduce color components at a given pixel.

The optics subsystem 114 receives the light output from the light source 112, either directly or after passing through the scanning subsystem 116. In some embodiments the optical subsystem collimates the light. In another embodiment the optics subsystem converges the light. Left undisturbed the light converges to a focal point then diverges beyond such point. As the converging light is deflected, however, the focal point is deflected. The pattern of deflection defines a pattern of focal points. Such pattern is referred to as an intermediate image plane.

The emitted light 136 is deflected along a prescribed pattern, such as a raster pattern, by a scanner subsystem 116. In an alternative embodiment another display format such as vector imaging can be used for scanning image elements onto the eye. In one embodiment the scanning subsystem 116 receives a horizontal deflection signal and a vertical deflection signal derived from the image data interface 111. The scanning subsystem 116 is located after the light source 112, either before or after the optics subsystem 114. In one embodiment the scanning subsystem 116 includes a resonant scanner for performing horizontal beam deflection and a galvanometer for performing vertical beam deflection. The horizontal scanner receives a drive signal having a frequency defined by the horizontal synchronization signal extracted at the image data interface 111. Similarly, the galvanometer serving as the vertical scanner receives a drive signal having a frequency defined by the vertical synchronization signal VSYNC extracted at the image data interface 111. Preferably, the horizontal scanner has a resonant frequency corresponding to the horizontal scanning frequency. In alternative embodiments, the scanning subsystem 116 instead includes acousto-optical deflectors, electro-optical deflectors, rotating polygons or galvanometers to perform the horizontal or vertical light deflection. In some embodiments, two of the same type of scanning device are used. In other embodiments different types of scanning devices are used for the horizontal scanner and the vertical scanner.

The light emitted from the display 22 is deflected by the beamsplitter 24 (see FIGS. 2 and 3) and directed toward a viewer's eye E. In the embodiment of FIG. 3 an eyepiece 34 also is included.

Meritorious and Advantageous Effects

An advantage of using a silhouette mask is that the content of the virtual image appears to be solid, rather than transparent. The virtual image overlays and eclipses the background objects. An advantage of locating the silhouette display source at the image plane is that the darkened silhouette is in focus. There is a sharp edge between the background and the silhouette mask. Another advantage is that the virtual image appears more real when the mask is in focus.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. An apparatus for presenting a composite image, comprising:
   a first image source which generates first image light;
   a controllable light barrier which receives external light not generated by the first image source, the barrier receiving the external light over a first area, the barrier being responsive to a signal which determines size and location of a spatial subarea within the first area at which the received external light is blocked, the barrier passing received external light not within the subarea; and
   a beam combiner which receives the first image light and the passed external light and outputs light forming the composite image.

2. The apparatus of claim 1, wherein the first image source is a scanned display.

3. The apparatus of claim 1, wherein the controllable light barrier comprises an LCD panel.

4. The apparatus of claim 1, wherein the external light is light from an external environment of the apparatus.

5. The apparatus of claim 1, wherein said signal is a masking signal and further comprising:
   an electronic controller coupled to the first image source and the controllable light barrier, the electronic controller being responsive to an image signal to provide a first signal to the first image source to define a first image portion and to provide the masking signal to the controllable light barrier.

6. The apparatus of claim 5, wherein the first image portion includes a selected item of image information, wherein the electronic controller is responsive to the image signal to selectively activate a region of the controllable light barrier aligned to the selected item of image information differently from another region of the controllable light barrier.

7. A method for presenting a composite image, comprising:
   generating first image light;
   receiving second light at a controllable light barrier, the second image light formed independently of the first image light, the barrier receiving the second light over a first area;
   blocking passage of the second light through the controllable light barrier at a select subarea of the first area, the subarea being selected in size, location and time;
   passing second light through the controllable light barrier at a remaining portion of the first area outside the select subarea
   a beam combiner which receives and combines the first image light and the passed second light to form light of the composite image.

8. The method of claim 7, further comprising:
   generating a control signal output to the controllable light barrier for determining the size and location of the select subarea at a given time.

9. The method of claim 7, in which the controllable light barrier is an LCD panel, and further comprising the steps of:
   identifying a position of a first image portion of the first image light;
   selecting pixels of the LCD array in response to the identified position of the first image portion; and
   activating the selected pixels to block second light.

10. The method of claim 9 wherein the step of selecting pixels of the LCD array in response to the identified position of the first image portion includes:
    identifying pixels of the LCD array that overlap the identified position, as viewed from a viewing location; and
    selecting the pixels from only the identified pixels.

* * * * *